May 1, 1923.
K. L. HANSEN
ARC WELDING DYNAMO ELECTRIC MACHINE
Filed Sept. 25, 1919
1,453,389
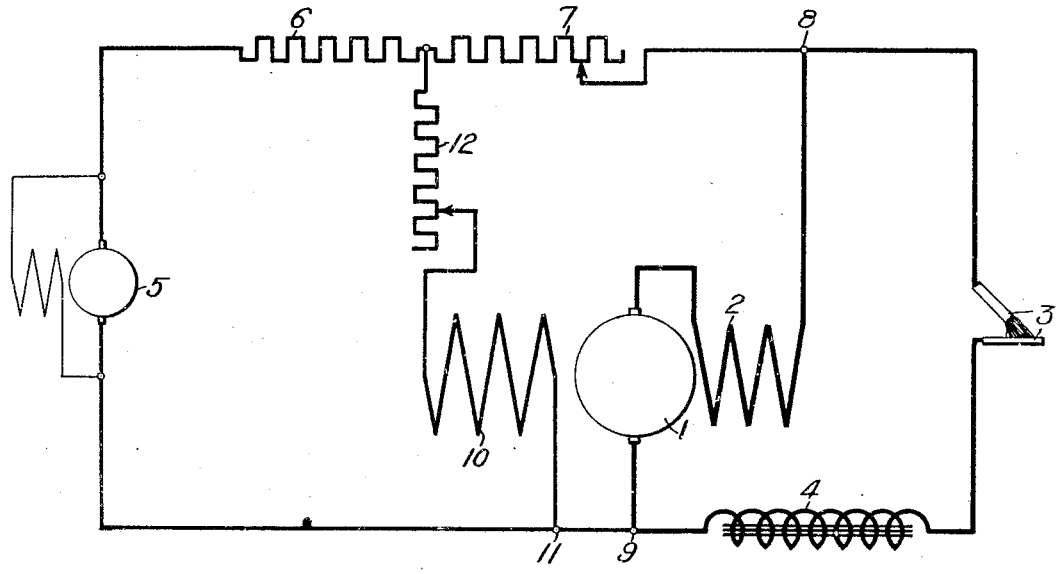
WITNESSES:
INVENTOR
Klaus L. Hansen.
BY
ATTORNEY Patented May 1, 1923.

1,453,389

UNITED STATES PATENT OFFICE.

KLAUS L. HANSEN, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING DYNAMO-ELECTRIC MACHINE.

Application filed September 25, 1919. Serial No. 326,294.

*To all whom it may concern:*

Be it known that I, KLAUS L. HANSEN, a citizen of the United States, and a resident of Wilkinsburg, in the county of Allegheny and State of Pennsylvania, have invented a new and useful Improvement in Arc-Welding Dynamo-Electric Machines, of which the following is a specification.

My invention relates to electric-arc welding systems and, more particularly, to generators of the constant-current type which may be employed in direct-current welding systems. The primary object of my invention is to provide direct-current welding systems in which ease of operation shall be combined with deposit-penetrating qualities to ensure strong and homogeneous welds.

In order to obtain a satisfactory direct-current welding system, careful attention should be given the design thereof so as to ensure the production of strong welds in such manner that the system may be properly operated by moderately skilled workmen. For example, it is possible to design a welding system in which ease of operation may be obtained but such ease of operation may seriously affect the production of strong welds because, if it is exceptionally easy to maintain an arc, the penetrating qualities may be seriously decreased. It is essential, therefore, in order to obtain a satisfactory system to combine good penetrating qualities with relative ease of operation.

One object of my invention, therefore, resides in the provision of a welding system which may be operated by moderately skilled workmen to obtain strong and homogeneous welds.

Many systems have been designed in which ease of operation has been obtained by employing a relatively bulky and heavy reactance in the external or welding circuit. Although a certain amount of reactance, in the welding circuit, is not objectionable, a very large and heavy reactance is objectionable because it materially increases the weight and the cost of the system.

Another object of my invention resides in the provision of a welding system in which ease of operation shall be obtained without the employment of a relatively large and heavy reactance.

A still further object of my invention is to provide a direct-current generator which may be embodied in a welding system and which shall possess such characteristics that the regulation thereof shall be relatively simple and easily governed.

With these and other objects in view, my invention will be more fully described and illustrated in the single figure of the accompanying drawing, which is a diagram of a welding system embodying my invention.

In practising my invention, I may provide a direct-current welding system by employing a constant-current type of generator. The generator is preferably provided with a plurality of field windings, one of which is excited by the current of the generator and the other of which is excited by an independent source of electric current. The generator may be connected to a plurality of electrodes and a reactance may be connected in series with the generator, if desired. However, the generator is primarily designed to ensure relative ease of operation without the employment of a reactance. I also employ a resistor which is connected in series with the independent source of excitation and a plurality of other resistors which are connected to the independent source of current, one of which is connected to the generator and the other of which is connected to the field winding which is excited by the independent source of current. The generator functions, at all times, to maintain a substantially constant-current through the electrodes or in the welding circuit.

In the drawings is shown a welding system comprising a generator 1 which has its armature connected, at one side, through a series field winding 2, to one of a plurality of electrodes 3 and, at its other side, through a reactance 4, to the other electrode 3. An independent source of electric current 5 may be connected in series with a resistor 6, and, through another variable resistor 7, to one terminal of the generator 1, as indicated at 8, and the other side may be connected to the other terminal of the generator, as indicated at 9. Another field winding 10, of the generator 1, may be connected to one side of the source of current 5, as indicated at 11, and to the other side thereof through a variable resistor 12.

The independent source of current 5 may be a small exciter, driven by a motor (not shown) which is employed to drive the generator 1. The field winding 10 is composed of slightly more ampere turns than the field winding 2 which it opposes at all times. This is necessary in order to obtain sufficient voltage across the generator to cause current to circulate in the welding circuit under short-circuit conditions. The welding circuit may be considered as including the generator 1, the field winding 2, the electrodes 3 and the reactance 4.

In operation, the independent source of current 5 generates the current which excites the field winding 10, and, when the electrodes are short-circuited, preliminarily to establishing an arc, the magnetomotive force established by the field winding 10 is slightly greater in magnitude than that established by the field winding 2 and sufficient current flows in the welding circuit to pre-heat the work and to facilitate the drawing of an arc. When the electrodes are separated, and an arc is established between them, the resistance of the welding circuit is increased, and the current from the exciter 5, which normally tends to divide between the resistors 7 and 12, then so divides between the resistors as to increase the excitation of the field winding 10. The resistors 7 and 12 may easily be proportioned to obtain any desired division of the current which flows from the independent source of current 5. The resistors are preferably embodied in a single rheostat and, after suitable proportions have been found, they may be regulated simultaneously.

It will be appreciated that, as the resistance of the welding circuit is increased, the current from the exciter 5 will be diverted more and more through the resistor 12 and the field winding 10 because the resistance of this path remains substantially the same. The resistor 6 is employed to obtain better regulation. The resistor 6 helps to more quickly reduce the value of the excitation of the field winding 10 when the welding circuit is closed and it also assists in building up of the magnetomotive force by the field 10 when welding operations are started.

The resistors 7 and 12 are preferably made variable for the reason that they should be adjusted to have different values according to the strength of welding current employed. The strength of the welding current is governed, to a great extent, by the character of the work and may vary from 50 amperes to 200 amperes or more. It will be appreciated, therefore, that various values of resistance must be provided by the resistors 7 and 12 when different values of welding current are desired. However, the relative proportions to which they are adjusted for one value of welding current is approximately the same for any value of welding current and these proportions may be readily found by adjustment under operating conditions.

It will be appreciated, from the foregoing description, that I have provided a welding system which automatically functions to maintain a substantially constant current in the welding circiut. Furthermore, the welding system is exceptionally compact and light in weight and embodies equipment which requires no delicate adjustments to obtain satisfactory operating conditions.

Although I have shown and specifically described a welding system embodying a generator particularly adapted therefor, it is obvious that other applications may be found for the generator and other connections and disposal of the elements which may be employed in the welding system, without departing from the spirit or scope of my invention, and I desire, therefore, not to be restricted to the particular system which I have shown by way of illustration, but desire to cover all such combinations as fall within the scope of the appended claims.

I claim as my invention:—

1. In an arc welding system comprising a plurality of electrodes, a generator connected thereto, an independent source of electric current, a field winding connected in series with the generator, another field winding so connected to the independent source of current as to oppose the action of the field winding connected in series with the generator, a resistor connected to the independent source of current and to the generator, and another resistor connected to the source of current and in series with the field winding connected thereto.

2. In an arc welding system comprising a plurality of electrodes, a generator connected thereto, an independent source of electric current connected to the generator, a resistor connected in series with the independent source of current, a field winding connected in series with the generator, another field winding so connected to the independent source of current as to oppose the action of the first mentioned winding, and a plurality of resistors connected to the independent source of current, one of which is connected to the generator and the other of which is connected to the field winding excited by the independent source of current.

3. In an arc welding system comprising a plurality of electrodes, a generator connected thereto, a reactance connected in series with the generator, an independent source of electric current connected to the generator, a resistor connected in series with the independent source of current, a field winding connected in series with the generator, another field winding so connected to the independent source of current as to oppose the action of the first mentioned winding, and a plurality of resistors connected to the independent source of current, one of which is connected to the generator and the other of which is connected to the field winding excited by the independent source of current.

4. In an arc welding system comprising a plurality of electrodes, a generator connected thereto, an independent source of electric current connected to the generator, a resistor connected in series with the independent source of current, a field winding connected in series with the generator, another field winding so connected to the independent source of current as to oppose the action of the first mentioned winding, and a plurality of variable resistors connected to the independent source of current, one of which is connected to the generator and the other of which is connected to the field winding excited by the independent source of current.

5. In an exciting system for generators, the combination of two exciting field windings, of an independent source of electric current connected to excite one of the field windings in opposition to the other, and means for increasing the excitation of the field winding connected to the source of current in proportion to an increase in resistance against the flow of current from the generator.

6. In an exciting system for generators, the combination of two exciting field windings, of an independent source of electric current connected to excite one of the field windings in opposition to the other, and a plurality of resistors connected to the independent source of current, one of which is connected to the separately excited field winding and another of which is connected to the generator.

7. In an exciting system for generators, the combination of two exciting field windings, of an independent source of electric current connected to excite one of the field windings in opposition to the other, two resistors connected to the independent source of current, one of which is connected to the separately excited field winding and the other of which is connected to the generator, and another resistor connected in series with the independent source of current.

In testimony whereof, I have hereunto subscribed my name this 3rd day of Sept., 1919.

KLAUS L. HANSEN.